Figure 1:
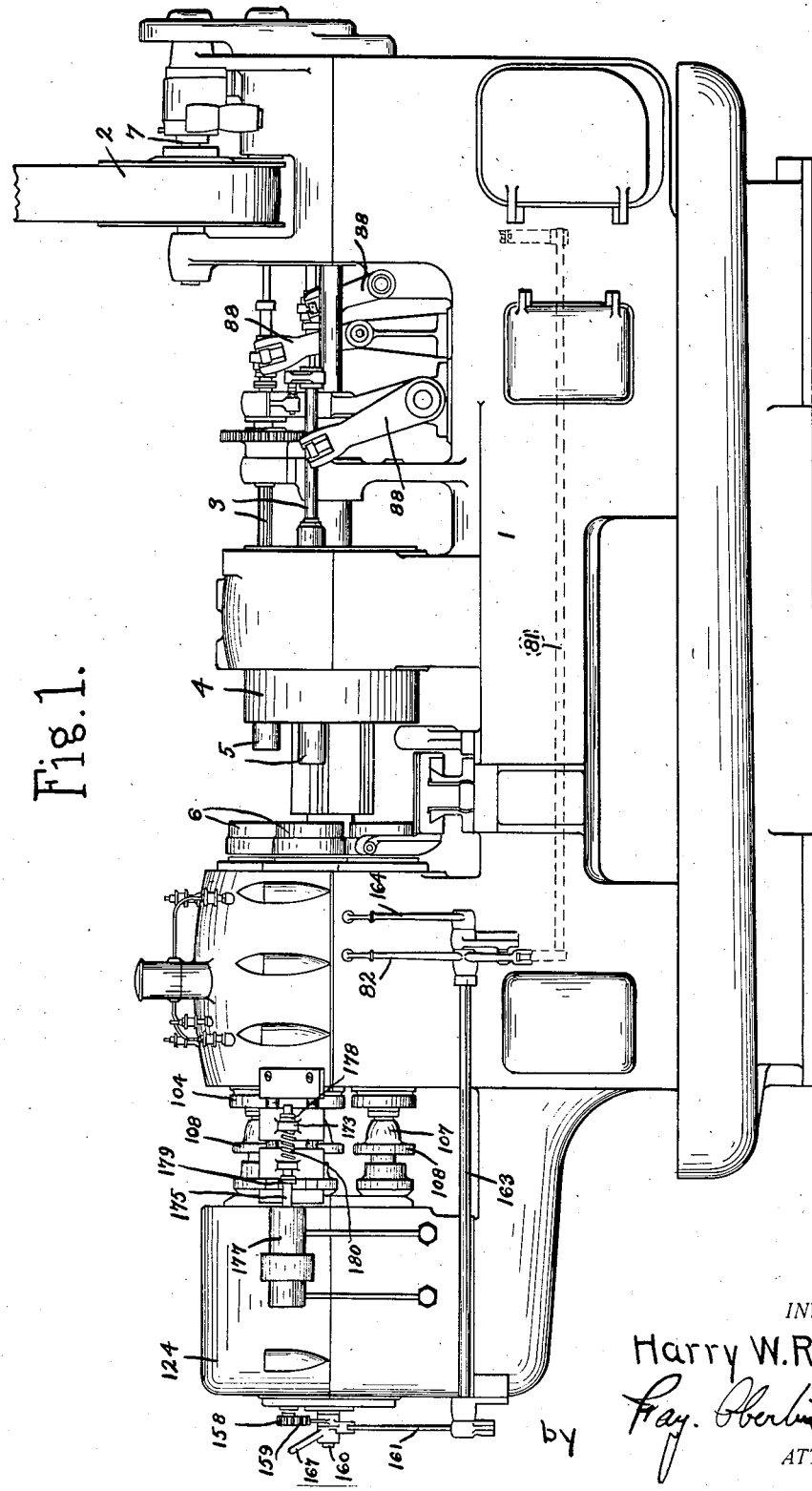

Aug. 18, 1936.   H. W. RUPPLE   2,051,747
MULTIPLE SPINDLE METALWORKING MACHINE
Original Filed July 9, 1931   8 Sheets-Sheet 1

INVENTOR.
Harry W. Rupple
by Fay. Oberlin + Fay.
ATTORNEYS.

Aug. 18, 1936.    H. W. RUPPLE    2,051,747
MULTIPLE SPINDLE METALWORKING MACHINE
Original Filed July 9, 1931    8 Sheets-Sheet 2

INVENTOR
Harry W. Rupple
BY Ray Oberlin Ray
ATTORNEYS.

Aug. 18, 1936.   H. W. RUPPLE   2,051,747
MULTIPLE SPINDLE METALWORKING MACHINE

Original Filed July 9, 1931   8 Sheets—Sheet 4

INVENTOR.
Harry W. Rupple
BY
Fay Oberlin & Fay
ATTORNEYS.

Aug. 18, 1936.　　　　　　　H. W. RUPPLE　　　　　　　2,051,747
MULTIPLE SPINDLE METALWORKING MACHINE
Original Filed July 9, 1931　　　8 Sheets-Sheet 6

INVENTOR.
Harry W. Rupple
BY
Ray Oberlin & Ray
ATTORNEYS.

Aug. 18, 1936.     H. W. RUPPLE     2,051,747
MULTIPLE SPINDLE METALWORKING MACHINE
Original Filed July 9, 1931    8 Sheets-Sheet 8
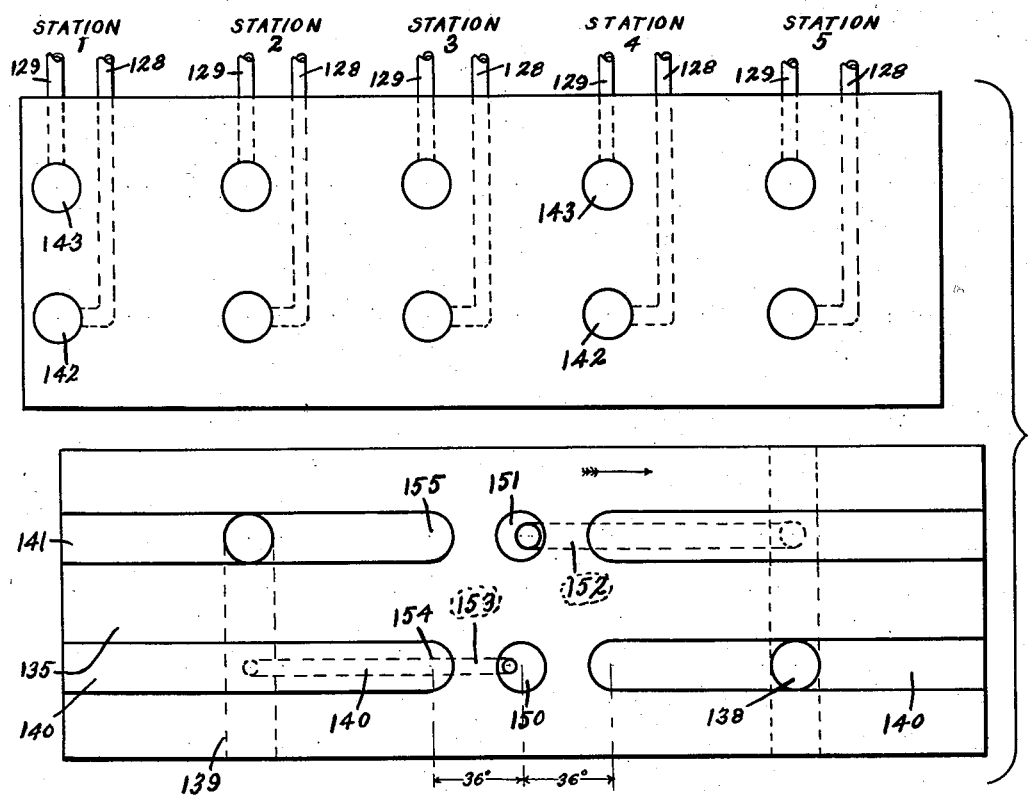
Fig 9
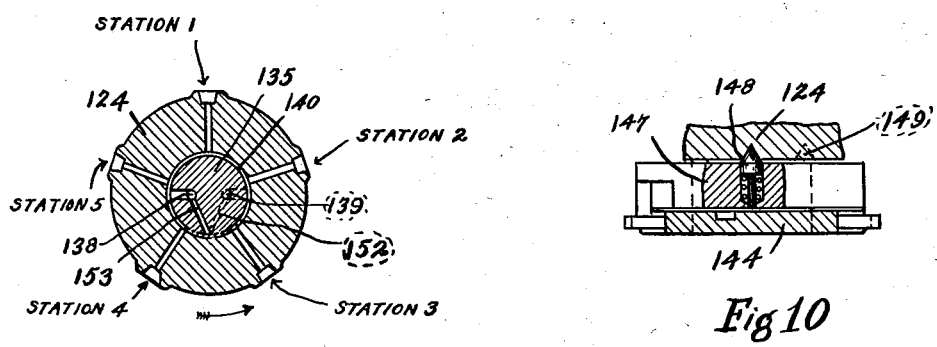
Fig. 11
Fig 10
INVENTOR.
Harry W. Rupple
BY
Ray Oberlin & Ray
ATTORNEYS, Patented Aug. 18, 1936

2,051,747

UNITED STATES PATENT OFFICE 2,051,747

MULTIPLE SPINDLE METALWORKING MACHINE

Harry W. Rupple, Shaker Heights, Ohio, assignor to The Cleveland Automatic Machine Company, Cleveland, Ohio, a corporation of Ohio Application July 9, 1931, Serial No. 549,586
Renewed September 1, 1934

41 Claims. (Cl. 29—38)

This invention, relating as indicated to metal working machines of the multiple spindle variety wherein a plurality of pieces of work are carried in a number of rotating spindles and several tools are mounted in a tool slide opposed to the work spindles, refers more particularly to an improved form of construction of mechanism for operating the chucks in which the work pieces are supported and further, an improved means for reciprocating the tool slide or tool carriers relatively to the work pieces to afford a simplification in the control of the machine and an increase in production.

More specifically, my invention relates to a form of fluid actuated means arranged to efficiently manipulate the chucks within which the work pieces are supported so as to facilitate the removal of the finished piece and insertion of a new blank as well as to insure that the work pieces will be rigidly supported in the chucks during the working operations.

A further object of my invention is to provide an improved arrangement for the driving means which reciprocate the tool spindles relatively to the work pieces so as to increase the efficiency of operation of the machine.

Other objects of my invention will appear as the description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
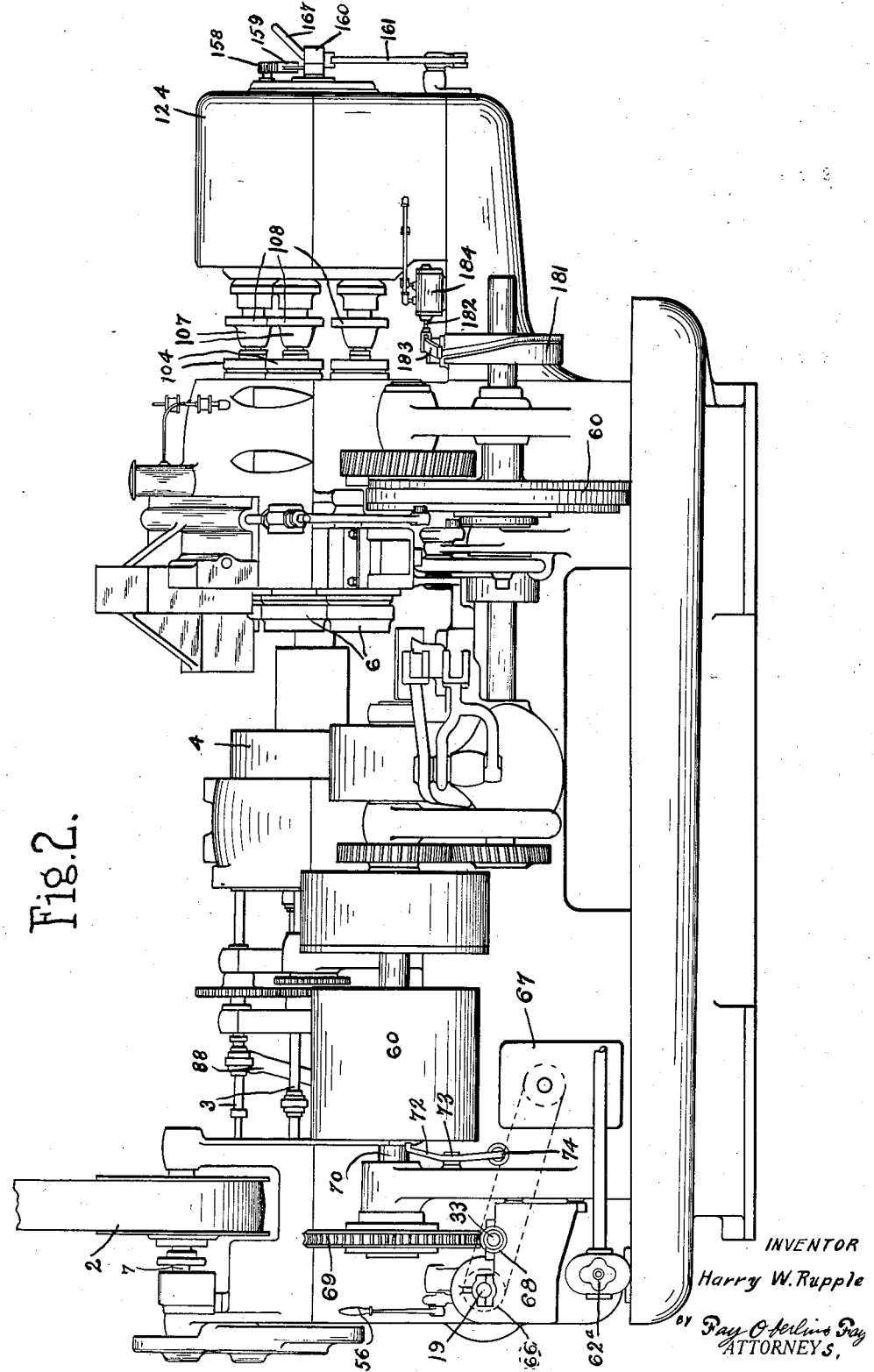
Figure 3:
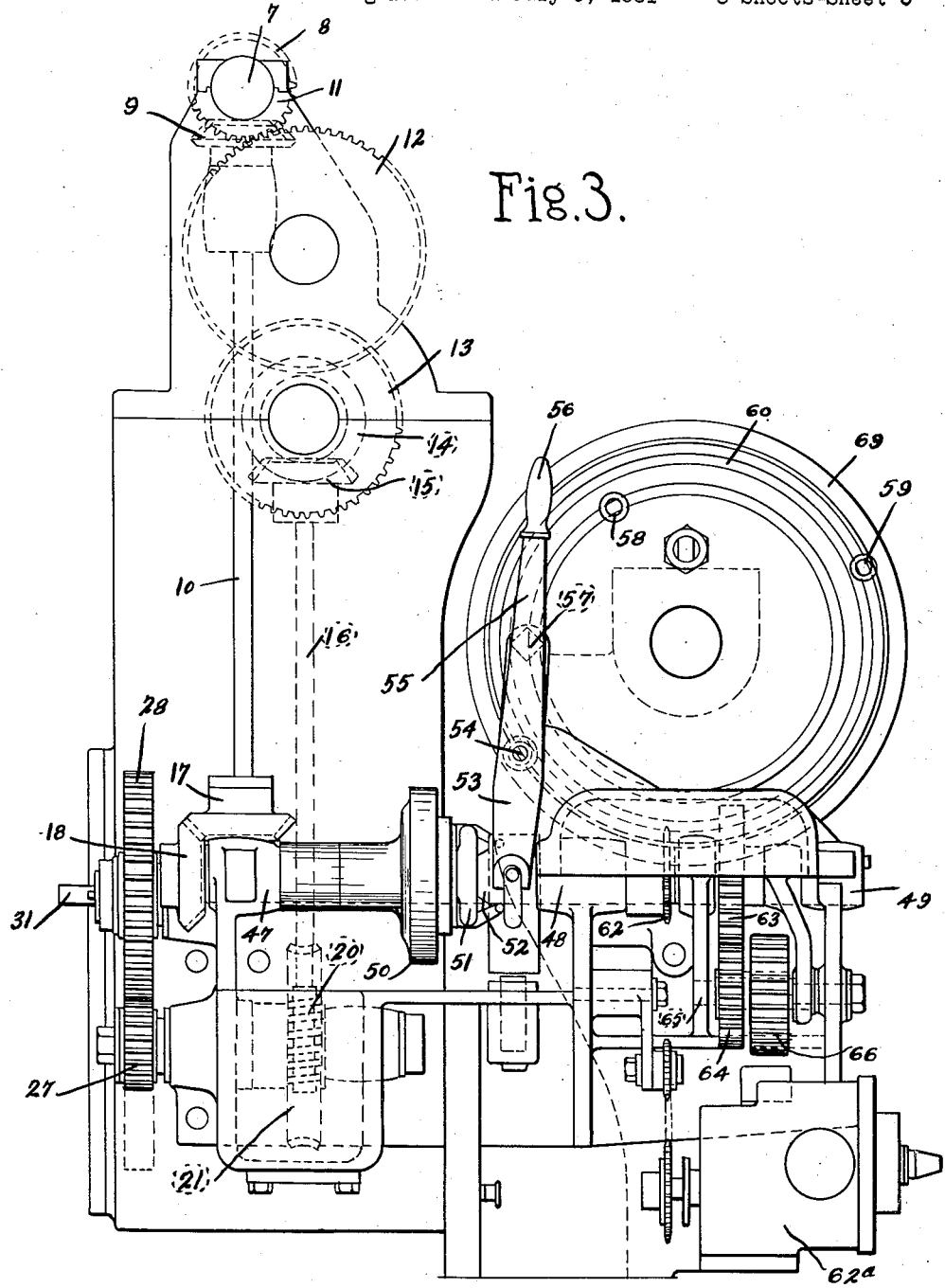
Figure 4:
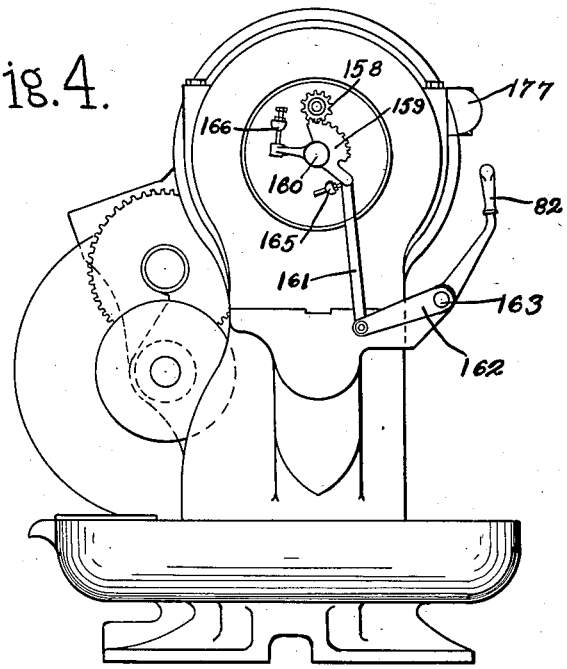
Figure 5:
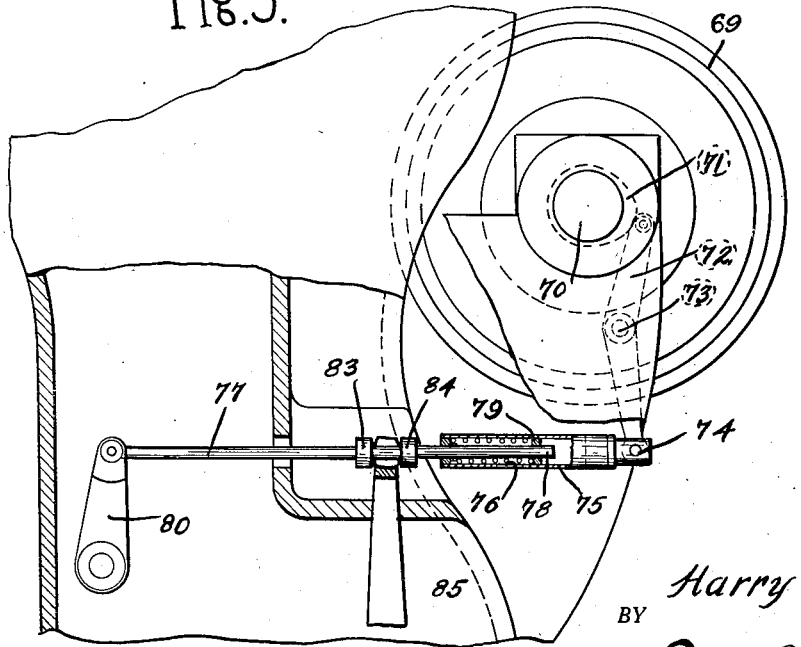
Figure 6:
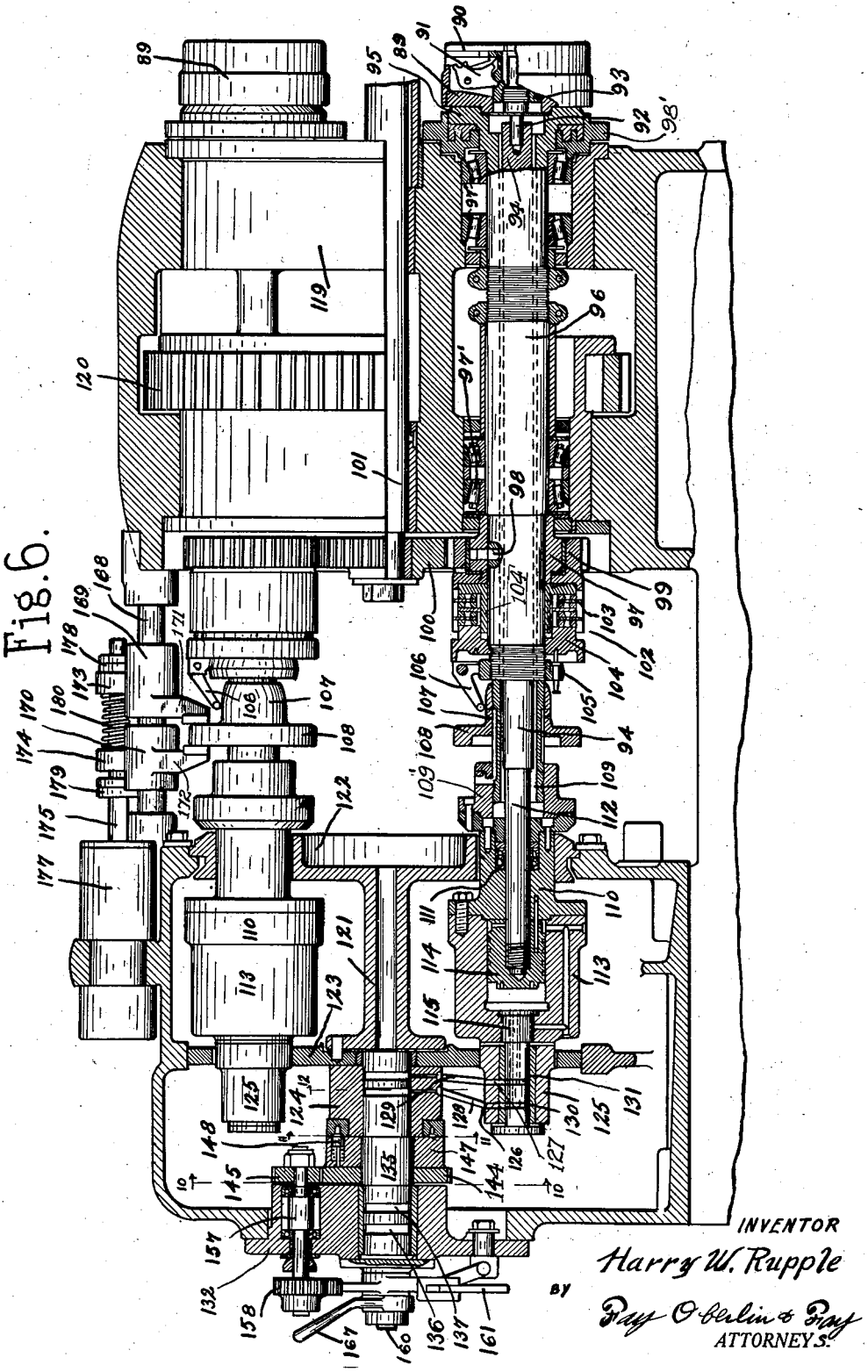
Figure 7:
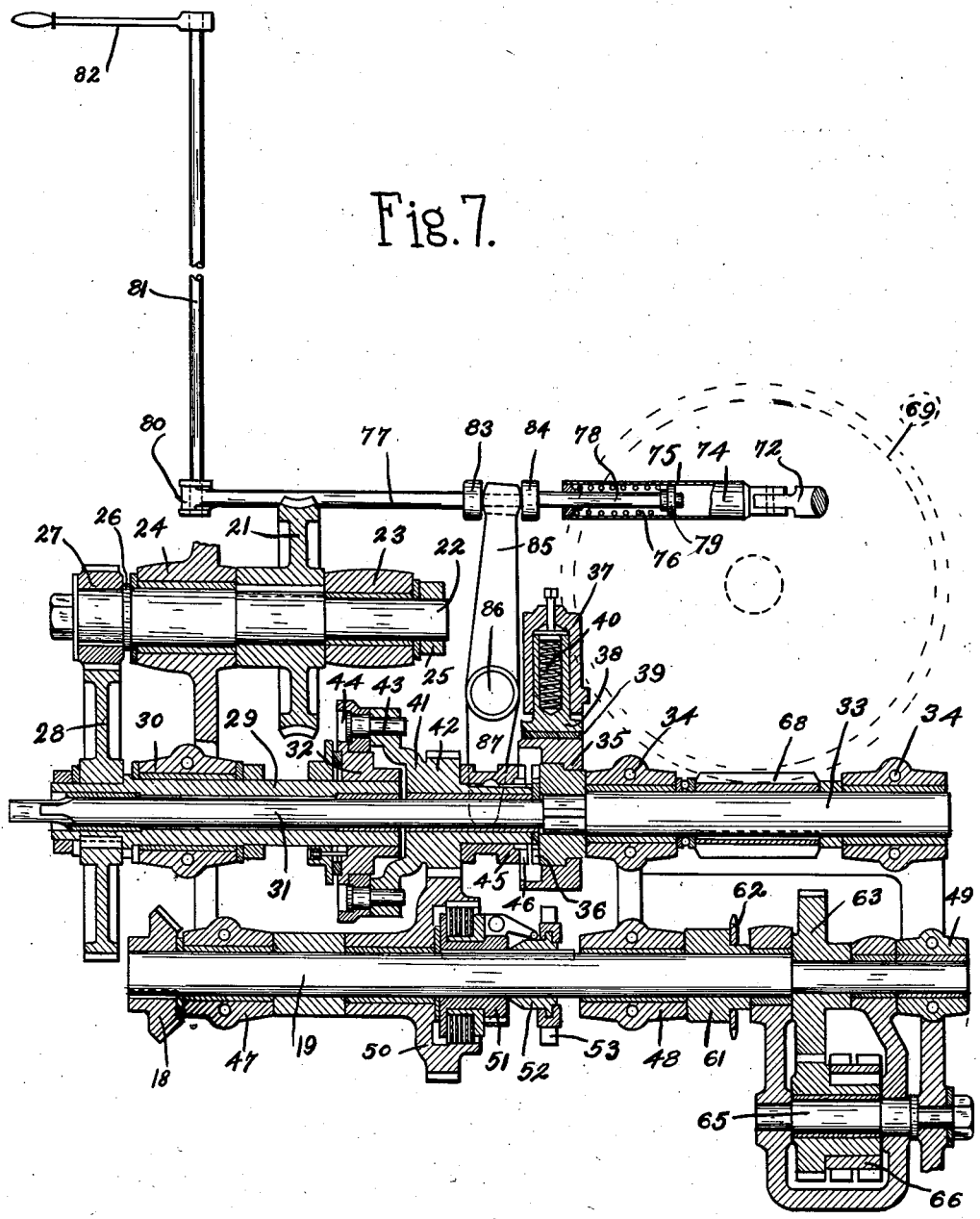
Figure 8:
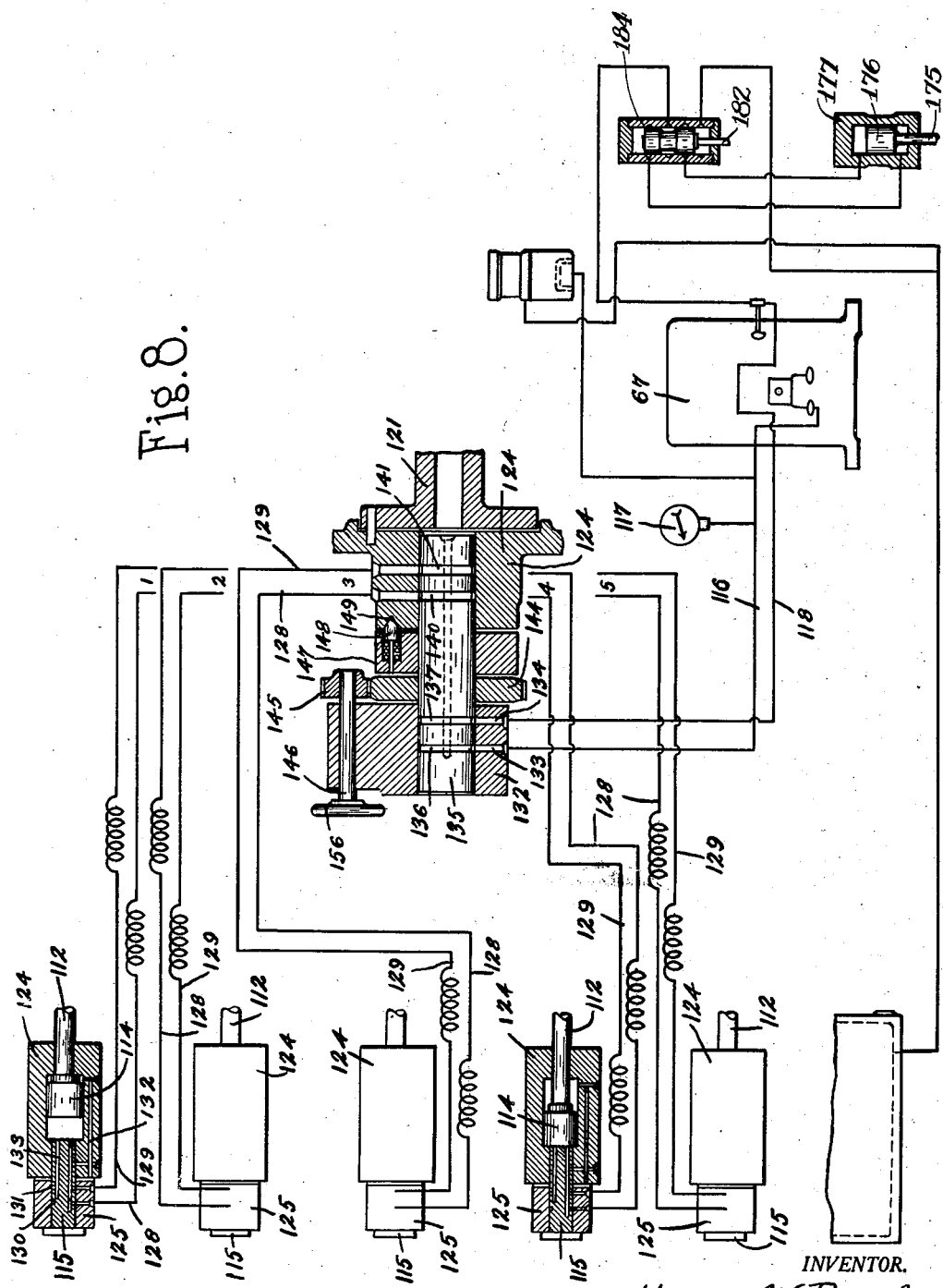

In said annexed drawings:

Fig. 1 is a front elevational view of a multiple spindle metal working machine having associated therewith the apparatus comprising my invention; Fig. 2 is a rear elevational view of the machine illustrated in Fig. 1; Fig. 3 is a side elevational view of the left end of the machine as illustrated in Fig. 2; Fig. 4 is a side elevational view of the right end of the machine as illustrated in Fig. 2; Fig. 5 is a fragmentary, part sectional, part elevational view of the machine showing particularly a portion of the safety mechanism; Fig. 6 is a longitudinal, sectional view of the machine illustrated in Figs. 1 and 2; Fig. 7 is a fragmentary, sectional view of a portion of the machine taken on a plane substantially normal to the projection planes of Figs. 1 and 2, specifically that portion of the apparatus adjacent the left end of the machine as illustrated in Fig. 2; Fig. 8 is a part diagrammatic, part sectional view showing the several pistons for actuating the chucks, the fluid supply pump, and the main distributory valve and associated mechanism; Fig. 9 is a development of the lateral surface of the main distributory valve and its housing illustrated in Fig. 8; Fig. 10 is a transverse sectional view of the valve manipulating apparatus illustrated in Fig. 6; and Fig. 11 is a transverse sectional view of the fluid distributing valve and its associated housing.

Referring now more specifically to the drawings and more particularly to Figs. 1 and 2, it will be noted that the metal working machine of the multiple spindle variety illustrated in this and the subsequent figures is provided with a base generally indicated at 1 which, along with numerous brackets and the like, supports the entire operating mechanism.

As is well known to those familiar with the art, the machine may be driven by means of a belt pulley 2 which, through a train of gears and cams forming no particular part of this invention, causes a reciprocation and/or rotation of the tool carrying spindles 3 which project beyond the tool support 4 in the form of chucks 5 adapted to present the several tools to the work pieces removably supported and carried by the chucks 6. The apparatus which effects this movement of the spindles relatively to the chucked work pieces is most clearly illustrated in Figs. 3 and 7.

The pulley 2 is mounted on a shaft 7 which has keyed thereto a bevel driving pinion 8 which is directly in mesh with a bevel pinion 9 carried by the upper end of the vertically disposed shaft 10 which is journaled at suitable points in the machine. The housing and the supports for the bearings in which the several shafts about to be described are journaled have been omitted from the drawings for the purpose of clarifying the same and to facilitate an understanding of the driving mechanism.

The shaft 7 likewise has keyed thereto a spur gear pinion 11 which, through the train of gears including spur gears 12 and 13 and bevel gears 14 and 15 drives the shaft 16.

It will be noted that as the pulley shaft 7 rotates, both shafts 10 and 16 will be rotated but the shaft 16 will rotate at a speed which is slower than shaft 10 by virtue of the fact that it is driven through the gear train just described.

The fast shaft 10 has a bevel pinion 17 keyed to its lower end, which pinion meshes with another bevel pinion 18 keyed to the terminal of a shaft 19, most clearly illustrated in Fig. 7. The slow moving shaft 16 terminally carries a worm 20 which meshes with a worm gear 21 which is most clearly illustrated in Fig. 7. The worm 21 is keyed to a short shaft 22 which is journaled intermediately of its ends in bearings 23 and 24 carried by suitable brackets in the frame of the machine. The shaft 22 is secured against axial movement by means of the removable end thrust collar 25 and an integral flange 26 respectively engaging the opposite ends of the bearing blocks 23 and 24.

Terminally keyed to the shaft 22 is a driving pinion 27 which meshes with a spur gear 28 keyed to a sleeve 29. The sleeve 29 is journaled in a bearing 30 carried by a portion of the machine base and such sleeve is on its inner periphery provided with bearings in which a shaft 31 is free to rotate. The sleeve 29, at its inner end, carries a ratchet 32 which is one element of an overrunning clutch.

The shaft 31 extends axially in an enlarged portion 33 which is journaled in bearings 34 carried by the machine frame. The shaft 33 has splined thereto a clutch housing member 35 which is provided with jaws 36 of the usual design. The frame of the machine has a bracket 37 associated therewith in which is resiliently supported a brake member 38 which is faced with a friction member 39 and pressed against the outer periphery of the housing 35 under the influence of the spring 40.

Rotatably mounted on the shaft 31 intermediately of the clutch housing 35 and the sprocket 32 is a spider 41 which may have formed integrally therewith a pinion 42. The spider 41 is provided with a plurality of radially and axially extending arms which carry stub shafts 43 on which are oscillatably mounted detents 44 adapted to engage the ratchet member 32.

Slidably keyed to the spider hub 41 is a clutch collar 45 which is provided with jaws 46 adapted to engage the jaws 36 of the housing 35 and establish driving communication between the spider 41 and the shaft 33.

The shaft 19 previously indicated as having the fast speed driving pinion 18 terminally keyed thereto is journaled in bearings 47, 48 and 49 carried by the web structure in the base of the machine. Rotatably supported on the shaft 19 is a driving gear 50 which is free to rotate relatively to the shaft 19 unless clutched thereto by the clutch generally indicated at 51. The clutch 51 is actuated by the cam member 52 which is actuated by a yoke arm 53 which is most clearly illustrated in Fig. 3.

The yoke arm 53 for actuating the clutch 51 is pivotally supported at 54 and provided with an oppositely directed manipulating handle 55. The handle 55 is terminally formed into a handhold 56 but it should be noted that this lever is normally actuated by means of a cam 57 which is moved in opposite directions under the influence of the cams 58 and 59 carried by the large cam wheel 60.

The shaft 19 may have a collar 61 secured thereto which carries a sprocket wheel 62 about which is trained a chain which is employed for the purpose of driving a pump 62a for supplying the fluid which is projected onto the work as the cutting or like operations are conducted. Such pump and its associated mechanism forms no part of this invention and hence, will not be described in greater detail at this point. The shaft 19 also carries a gear 63 which meshes with a driven gear 64 rotatably supported on a stub shaft 65. The hub of the gear 64 has a sprocket 66 keyed thereto. The sprocket 66 has trained thereabout an endless chain which drives the fluid pump 67, which is illustrated in Fig. 8 and which supplies fluid under pressure for the purpose of actuating the work supporting chucks by the means and in the manner hereinafter more fully explained.

The shaft 33 has keyed thereto a worm 68 which meshes with and drives the bull gear 69 of the machine which is most clearly illustrated in Figs. 3, 5, and 7. The bull gear 69 of the machine is mounted on a shaft 70 and upon rotation, carries the main cam wheel 60 of the machine therewith. The shaft 70 has a cam 71 associated therewith which, upon rotation of the shaft, oscillates the arm 72 which intermediately of its ends is pivotally supported at 73 and at its opposite end oscillatably secured to the housing 74.

The housing 74 has a substantially tubular body 75 in which is mounted a compression spring 76. A shaft 77 has a terminal portion 78 extending into the housing 74 and such shaft terminally has a thrust collar 79 secured thereto against which the spring 76 seats and urges the shaft 77 to the right, as most clearly illustrated in Figs. 5 and 7.

The shaft 77 is oscillatably secured to an arm 80 at its opposite end, which arm may be in the form of a bell crank and have associated therewith a shaft such as 81 and a manipulating handle such as 82, whereby the shaft 77 may be moved axially against the spring 76. The shaft 77 is provided with spaced collars 83 and 84 which engage the bifurcated terminal portion of a clutch actuating arm 85. The clutch actuating arm 85 is pivotally supported as at 86 and at its opposite end 87 is adapted to engage and slide clutch member 45 into and out of engagement with the jaws 36.

The main cam wheel 60 of the machine has a plurality of cams operating in contact therewith which are for the purpose of effecting oscillation of the several arms such as 88, most clearly illustrated in Fig. 1. The arms 88 terminally slidably engage suitable cross-heads carried by the tool supporting spindles 3 so that as these arms oscillate, the tools are moved relatively to the chucks 6. The cam faces on the main cam wheel 60 are arranged so that upon the unidirectional rotation thereof the arms 88 will be oscillated in both directions to effect a movement of the tools, both towards and away from the work.

In order to increase the efficiency of the operation of the machine and further to increase the productive capacity of the machine, it is possible to retract the work spindles from the work at a relatively rapid rate in order to decrease the time interval required between successive indexing movements of the chuck supporting structure. While the speed of the tool spindles towards the work must be relatively slow as governed by the cutting rate of the tools, nevertheless, the rate of retraction of the tools has no such limiting factors. The apparatus just described and which is most clearly illustrated in Figs. 3 and 7 is for the purpose of effecting a relatively slow feeding movement of the tool spindles towards the work and a relatively rapid retracting movement of such spindles away from the work.

From the foregoing description, it will be noted that the main cam 60 and the cams associated therewith which produce the above described movement of the tool supporting spindles, is driven by means of the worm 68 so that the rate of rotation of the cams depends upon the rate of rotation of the shaft 33.

In all metal working machines of the multiple spindle type, it is desirable and highly necessary that some means be provided which will make the operation of the machine dependent upon the presence of an operator who can observe its operation and prevent damage to any of the parts in case of accidental failure of any of the tools which are being employed.

To this end, I have provided the clutch members 35 and 45 which are normally held out of engagement by means of the shaft 77 under the influence of the compression spring 76. In order to have the machine operated at all, it is necessary for the operator to bring sufficient pressure to bear against the handle 82 to overcome the spring 76 and maintain the clutch members 35 and 45 in engagement. If the operator should accidentally walk away from the machine at the time the same is in operation, the spring 76, in the manner described, will immediately effect a disengagement of the drive to the bull gear 60 so that the operation of the machine is automatically discontinued.

As previously indicated, in connection with the description of the apparatus illustrated in Fig. 3, it will be noted that the fast and slow moving drive shafts 10 and 16, respectively, are both rotating at constant speeds depending, of course, upon the speed of rotation of the driving pulley. As the slow speed shaft rotates, thereby effecting rotation of the gear 21, the sleeve 29 and the associated ratchet 32 will be likewise rotated. As the ratchet 32 rotates, the same will cause a rotation of the spider 41 through the medium of the detents or pawls 44. If the clutch members 36 and 46 are engaged, then the bull gear 60 will be driven by the worm 68 at a speed which will be referred to as the slow speed of the machine. As the cam wheel 60 rotates carrying therewith the cam members 58 and 59, one of such cam members will engage the cam 57 carried by the clutch manipulating handle 55 and move the clutch cam member 52 to the left into the position in which the same occupies in Fig. 7. This cam member 52 moving axially of the shaft 19, will effect driving engagement between the plates of the clutch member 51 so that the shaft 19 will now drive the spider 41 through the gears 42 and 50 at a speed in excess of the rotation of the ratchet member 32. This increase in the speed of the ratchet member 41, while the sleeve 29 continues to rotate, is made possible by virtue of the detent and ratchet connection between the sleeve 29 and the spider 41. This increased speed will be reflected in an increased speed of the operation of the main cam wheel and consequently, in the operation of the tool supporting spindles and such increased speed will be maintained until the other of the cam members 58 and 59 comes into engagement with the cam member 57 and move the clutch cam member 52 to the right from its position illustrated in Fig. 7.

Due to the fact that the cam members 58 and 59 are secured in grooves carried by the cam wheel, which permit adjustment thereof about the axis of such cam, the high speed periods of operation of the machine may be accurately controlled as to duration and further, as to the time at which the tools will be retracted after they have been moved into engagement with the work.

The form of construction of the work piece supporting chucks and the means immediately associated therewith for the purpose of effecting chucking or unchucking of the work pieces is most clearly illustrated in Fig. 6.

While the particular machine disclosed and described in this application is of the five spindle type, nevertheless, the principles comprising my invention may be employed in connection with the operation of a machine regardless of the number of spindles which might conveniently be employed.

Inasmuch as the construction of the chucking apparatus for the several chucks is identical, only one system has been illustrated in detail in Fig. 6, it being understood that the same construction will be duplicated for each separate chuck.

The body of the chuck, as illustrated in Fig. 6, is generally indicated at 89 and has jaws 90 associated therewith which are moved axially under the influence of cam members 91 which are, at their inner ends, in contact with and responsive to the axial movement of the cam member 93. The cam member 93 is carried by stub shaft 92 secured to the terminal of a shaft 94.

The body 89 of the chuck is mounted on a head 95 secured to the terminal portion of a rotating sleeve 96 journaled in suitable bearings 97' carried by the frame of the machine and provided with oil retainers 98'. The sleeve 96 has a collar 97 secured thereto by means of a key 98. Journaled on the collar 97 is a driving gear 99 which meshes with and is driven by a central pinion 100. The central pinion 100 is mounted on a shaft 101 which is driven by means of a suitable train of gears from the driving pulley 2 of the machine. The pinion 100 meshes with all five of the gears 99 so that all five spindles of the machine may be rotated simultaneously.

The gear 99 has an axially extending flange 102 which engages alternate clutch plates 103, the alternate set of which is splined to a clutch hub 104' adjustably secured to the sleeve 96. The sleeve 96 has a clutch collar 105 secured thereto which carries cam arms 106 adapted to be actuated by a cam member 107. The cam arms 106 engage a member 104 also splined to the clutch hub 104'. When the cam member 107 is moved axially under the influence of apparatus presently to be described, driving communication between the gear 99 and the sleeve 96 may be effected or interrupted. The cam member 107 is slidably keyed to the sleeve 96 and is provided with an annular flange 108 for the purpose hereinafter more fully explained.

The left end 109 of the sleeve 96 is secured by a flanged coupling 109' to a head 110 which is provided with a gland 111 through which the reduced terminal 112 of the shaft 94 projects. The head 110 has a cylinder member 113 secured thereto in which is mounted a piston 114 secured to the terminal 112 of the shaft 94.

Secured in an aperture provided therefor in the end of the piston housing 113 is a valve pintle 115, the construction of which is hereinafter more fully explained. By means of the valve pintle 115 and the ducts provided in the housing 113 of the cylinder, fluid may be introduced to opposite sides of the piston 114 so as to effect axial movement in either direction of the shaft 94. As the shaft 94 is moved axially, the cam member 91 will be moved accordingly to effect a movement of the jaws 90 into or out of engagement with the work piece.

The construction and operation of the fluid supply stream for the several cylinders by means of which the chucking operation is effected, will now be described with reference to Figs. 8 and 11.

As previously indicated, the fluid under pressure is supplied to the apparatus presently to be described by means of a pump 67. This pump forms no part of this invention and hence, will not be described in greater detail other than to specify that the fluid is supplied from the pump under pressure through the conduit 116 which may have a pressure gauge 117 associated therewith. The fluid from the chucking apparatus is returned to the pump by means of the conduit 118. The conduits 116 and 118, which are respectively supply and return conduits, are connected to a main distributing valve which will now be described.

The position of this valve in the assembled machine is most clearly illustrated in Fig. 6. Before proceeding with the description of the distributing valve, it may be well to note that the entire chucking mechanism carrying the five chucks is mounted on or associated with a housing 119, which is rotated by suitable driving gear meshing with the ring gear 120 carried by such housing.

A skeleton form generally indicated at 121, which has spaced substantially parallel frame members generally indicated at 122 and 123 associated therewith, rotatably supports the several cylinders in the housing 124 of this portion of the machine.

It will be noted that the frame plate 123 carries therewith the block or body 124 of the distributing valve. It may be well to further note that the terminal sleeves 125 associated with the cylinder housings 113 are rigidly secured to the frame member 123 and therewith rotate about the axis of the gear 120, whereas, the housing members 113, in addition to such revolution about the axis of the gear 120, rotate about the axis of the shafts 94.

The non-rotatable sleeve 125 in which the pintle 115 is rotatably supported has associated therewith fluid ports 126 and 127. Each of these ports has a fluid conduit 128 and 129 associated therewith and leading therefrom to similar ports in the body 124 of the main distributing valve. The ports 126 and 127 respectively terminate on the inner periphery of the member 125 over annular grooves 130 and 131 formed in the outer periphery of the pintle 115.

As most clearly illustrated in Fig. 8, the grooves 130 and 131 have ducts 132 and 133 associated therewith which lead to opposite sides of the piston 114.

It will, therefore, be noted that as the pressure supplied by the conduits 128 and 129 is varied so that one overcomes the other, then the piston 114 will be moved axially to effect a chucking or de-chucking of the work piece. The manner in which the fluid is supplied through the several conduits 128 and 129 leading from the central distributing valve to the several pistons and their associated pintles will best be understood by having reference to Figs. 8, 9 and 11.

The pressure and return lines 116 and 118, respectively leading from the pump 67, are connected to the stationary housing member 132 so as to be in communication with ducts 133 and 134 formed therein.

Rotatably mounted within the member 132, closely embraced thereby and extending axially into the rotating body is a cylindrical valve member 135. The valve member 135 is provided with two annular grooves 136 and 137 which respectively, register with the ducts 133 and 134. The grooves 136 and 137 have respectively associated therewith ducts 138 and 139 which are most clearly illustrated in Figs. 9 and 11 as extending axially of the valve member 135.

That portion of the valve member 135 which is encompassed by the rotating body 124 is shown in the development in Fig. 9. The grooves 136 and 137 are, through the ducts 138 and 139 respectively, in communication with grooves 140 and 141 extending substantially entirely around the periphery of that portion of the valve 135 encompassed by the member 124.

It may be well to state that the desired function of the valve 135 and its associated mechanism is to supply fluid under pressure to all five of the chuck operating pistons so that the work pieces are secured in the chuck at all stations but so that the operator may, by the proper manipulation of the valve, release that chuck which is in the loading station so as to remove the finished piece and substitute therefor a fresh blank.

The inner periphery of the rotating body 124 is shown developed above the development of the outer periphery of the valve member 135 in Fig. 9. It will be noted that the inner periphery of the member 124 is provided with five pairs of equally spaced ports 142 and 143 which are in communication with the five pairs of conduits 128 and 129 which lead to the several cylinders of the chucking mechanism. In order for the chuck jaws 90 to rigidly grip the work pieces, it is necessary, as most clearly illustrated in Fig. 6, that the pistons 114 be urged to the left in the cylinder housings 113. During the period when the work pieces are supported in the chucks, therefore, it is necessary that the actuating fluid under pressure be supplied to the various chucking stations through conduits 128 which will make the conduit 129, the low pressure or return side of the line. The circumferentially alined ports 143 are, therefore, arranged to register with the groove 140 in the valve and the alined ports 142 are arranged to register with the groove 141 in the valve.

When the valve 135 and housing 124 are positioned relatively to each other as illustrated in Fig. 9, then all of the chucks will be gripping the work pieces.

Assuming that station No. 4 is that station at which the finished work piece is removed from the chuck and a new blank inserted in lieu thereof, this chuck at station No. 4 may be caused to release the work piece in the following manner:

The valve member 135 will be caused to rotate in the direction illustrated by the arrow in Fig. 9 through an arc of 36° by means of a gear 144 which meshes with a driving pinion 145 keyed to a shaft 146. As the valve 135 is caused to rotate in the manner described, a collar 147 keyed to the valve is likewise caused to rotate relatively to the body or housing member 124. The collar 147 carries a resiliently mounted ball stop 148 which engages any one of a plurality of ten circumferentially spaced depressions 149 formed on the contiguous face of the member 124.

After the valve has been rotated in the manner described, then the ports 142 and 143 will respectively register with ports 150 and 151 formed in the valve 135. The port 151 is in communication with the pressure duct 138 by means of a duct 152 and the port 150 is in communication with the return duct 139 through a choke duct 153, the cross-sectional area of which is less than the area of the duct 152.

It will be noted, therefore, that with the valve in this adjusted position, the direction of fluid flow or pressure through the conduits 128 and 129 will be reversed so as to cause the piston 114 of station No. 4 to move to the right, as illustrated in Fig. 6, and accordingly cause a disengagement between the jaws of the chuck and the work piece.

When the valve is rotated through an arc of 36° in the manner just described, the relation between the ports 142 and 143 leading to the other chuck stations remains the same with respect to the grooves 140 and 141 so that the pressure is maintained on all of the other working stations and the work pieces accordingly properly supported during the time when the chuck at station No. 4 is released.

After the finished work piece has been removed from station No. 4 in the manner described, a new work piece may be inserted in the chuck and such chuck closed by rotating the valve 135 through a further arc of 36°.

When the valve has been rotated for this second 36° increment, the ports 142 and 143 will be brought into position on the valve 135 at the points indicated by 154 and 155. The direction of pressure for fluid flow through the conduits 128 and 129 is, therefore, again reversed to the initial direction so that the piston 114 is again moved to the left closing the chuck.

When this work piece has been chucked, the tool spindles will be caused to move towards the work pieces to perform the particular function for which they have been arranged and designed. This movement of the tool spindles towards the work will be accomplished by means of the driving mechanism previously described and will continue until the tools have moved for the distance determined by the setting of one of the cam members 58 or 59, whereupon, the tool spindles will be retracted from the work to await the next operation. As soon as the tool spindles have been retracted through the driving mechanism common to this type of automatic metal working machine, the gear 120 will be caused to rotate through an arc of 72° for a five spindle machine. As the gear 120 rotates through an arc of 72°, it carries therewith the frame member 123 and this member carries therewith the body or housing 124 of the valve 135.

As above indicated, the collar 147 is keyed to the valve 135. As the housing 124 rotates, the engagement of the plunger 148 with an aperture 149 on the housing 124 will cause a like rotation of the valve member 135 so that as the machine indexes, the relation between the valve and the housing will not be disturbed. As the machine indexes, however, a new station, i. e., station No. 5, moves into the loading and unloading position. This station is then unloaded and loaded identically in the manner in which the loading and unloading operation of station No. 4 was carried forth.

Should anything happen at any of the working stations which would require a removal of the work piece at such station before the machine indexes around to bring this station to the loading and unloading position, the chuck at such station may be released by simply rotating the valve around until the ports intermediately of the grooves, i. e., the reversing ports, are brought opposite to the ports from which the fluid conduits lead to the particular work station at which the trouble has occurred. The replacement of the work or the repair of a tool at any particular station is made possible without the necessity of having the machine index around until such station is in the loading and unloading position but the replacement may be made immediately and operations assumed with only a minimum loss of time.

In Fig. 8, the means provided for actuating the shaft 146 and accordingly the valve 135, is shown as a handwheel 156 which may be of well known form of construction or other means might be provided such as is most clearly illustrated in Fig. 6 for effecting the drive of the pinion 145.

In Fig. 6, the pinion 145 is supported on the inner end of a shaft 157 which is journaled in suitable bearings carried by the housing of the machine. The shaft 157 carries a pinion 158 which meshes with a gear segment 159 oscillatably supported on a stub shaft 160. The gear segment 159 has a link 161 oscillatably secured thereto which, at its opposite end, is connected to an arm 162 which is keyed to a shaft 163. The shaft 163 extends along the front of the machine and has secured thereto a manipulating handle 164 so positioned as to be within easy reach of the operator of the machine as he observes the operation of the tools on the work. In order to assist the operator in determining the limits of movement of the valve during the chucking and unchucking procedure just described, stops such as 165 and 166 may be provided to limit the arcuate movement of the gear segment 159.

As illustrated in Figs. 1 and 6, the gear segment 159 may have a handle 167 secured thereto for the purpose of facilitating the manipulation of the valve through the pinion 145 from the end of the machine.

As previously stated, the sleeve 96 in the loading and unloading position will be stopped from rotation during the time the loading and unloading operation takes place. This, as likewise previously stated, is effected by axial movement of the cam member 107 which carries the annular flange 108. In addition to halting the rotation of the sleeve 96 at the time the particular chuck spindle moves into the loading and unloading position, some means should be provided for braking such spindle so as to immediately bring the same to rest and further, to hold the same at rest during the time the loading and unloading operation proceeds. The mechanism for accomplishing this result is most clearly illustrated in Figs. 2 and 6.

The frame of the machine carries a non-rotatable shaft 168 on which are slidably keyed collars 169 and 170. These collars respectively carry arms 171 and 172 respectively, in engagement with opposite sides of the flange member 108.

The collars 169 and 170 likewise have rigidly secured thereto and preferably formed integrally therewith brackets 173 and 174. Slidably supported in the brackets 173 and 174 is a piston rod 175 extending from the piston 176, most clearly illustrated in Fig. 8, which operates in the cylinder 177. The piston rod 175 has collars 178 and 179 secured thereto and intermediately of the brackets 173 and 174, the piston rod 175 carries a compression spring 180 which normally maintains the arms 171 and 172 separated sufficiently to permit the flange members 108 to move into and out of alinement therewith as the machine indexes. The arms 171 and 172 are arranged so that the flange member 108 of one of the chucking spindle assemblies is positioned intermediately thereof as this particular spindle assembly occupies the loading and unloading position. As the machine indexes so as to bring this chucking spindle assembly into loading and unloading position, the cam 181, as most clearly illustrated in Fig. 2, will be rotated to cause an axial movement of the valve stem 182 through the medium of the lever arm 183. The valve stem 182 extends into the valve 184, the construction of which is such that the fluid under pressure diverted thereby will cause a reciprocation of the piston 176 in the cylinder 177.

Immediately after the particular chucking spindle assembly moves into the loading and unloading position so that the flange member 108 will be positioned intermediately of the arms 171 and 172, then the piston rod 175 will be moved to the left which will cause the collar 178 through the bracket 173 to move the arm 171 to the left disengaging the clutch 104 and by virtue of the pressure exerted by the arm 171 on the flange 108 brake the rotation of the sleeve 96 and cause the same to come to rest.

After the loading and unloading operation has been completed, then a further rotation of the cam member 181 will cause the piston arm 175 to move to the right again causing the arm 172 to move the cam member 107 axially on the sleeve 96 so as to clutch such sleeve to the driving gear 99.

When the above described apparatus is employed in association with a metal working machine of the multiple spindle variety, the manner in which the operation of the machine may be controlled by the operator is greatly simplified, the time required for the loading and unloading of the chuck at the working station is greatly reduced, the output of the machine accordingly materially increased and the general efficiency of its operation materially enhanced.

A further description of the apparatus comprising my invention is believed unnecessary for those familiar with the art.

It will be noted that numerous gear trains, driving cams and the like forming a part of the operating mechanism of the machine have not been described inasmuch as the same form no part of this invention and since the operation thereof in no way materially affects the operation of the apparatus comprising my invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a machine of the character described, the combination of a plurality of chucks adapted to support a respective number of work pieces, means responsive to fluid pressure in opposite directions adapted to selectively move said chucks into and out of engagement with work pieces, a source of unidirectional fluid pressure, a distributor valve adapted to maintain unidirectional fluid pressure on the actuating means of said chucks while at the working station and adapted to selectively reverse the fluid pressure to the actuating mechanism of the chuck at the loading station, and means for moving said valve.

2. In a machine of the character described, the combination of a plurality of rotatable chucks supported in a revolvable frame and adapted to removably support work pieces, means adapted to selectively drive said chucks, means carried by said frame and said chuck driving means and responsive to fluid pressure in opposite directions adapted to move said chucks into and out of engagement with the work pieces, a pump adapted to supply fluid under pressure to said chuck actuating means, a distributing valve adapted to effect an opening and closing of one of said chucks while the rest of the chucks are maintained in engagement with the work pieces and means for moving said valve independently of the movement of said frame.

3. In a machine of the character described, the combination of an indexable spindle turret, a plurality of spindles supported by said spindle turret, each of said spindles comprising a movable member and a fluid pressure operated motor operatively connected to said member, means for driving said spindles, fluid pressure operated means for disconnecting said driving means to one of said spindles, valve means comprising relatively movable parts operatively connected to a plurality of said motors, means for indexing said valve means with said turret, and means for moving one of said parts independently of said turret.

4. In a machine of the character described, the combination of an indexable turret, a plurality of work engaging members supported by said turret, a plurality of fluid pressure operated motors operatively connected to said work engaging members, means for controlling the flow of fluid to said motors, means for driving said work engaging members, fluid pressure operated means for disconnecting said driving means to one of said spindles, valve means for controlling the flow of fluid to the last mentioned fluid pressure operated means, and means for automatically controlling said valve in predetermined relation to the other operations of the machine.

5. In a machine of the character described, the combination of a frame, a turret rotatably supported by said frame, means adapted to periodically index said turret, a plurality of work supporting means supported by said turret, a slidable member supported by each of said work supporting means, a fluid pressure actuated motor supported by said frame, means adapted to operatively connect said fluid pressure motor successively to said slidable members, and means adapted to automatically control the supply of fluid to said fluid pressure operated motor in predetermined timed relation to the indexing of said turret.

6. In a machine of the character described, the combination of an indexable spindle turret, means adapted to index said turret, a plurality of spindles supported by said spindle turret and adapted to be indexed through a plurality of stations, means adapted to rotate said spindles, fluid pressure operated means adapted to connect and disconnect said means to and from said spindles successively at one of said stations, valve means adapted to control the flow of fluid to said fluid pressure operated means, and automatic means adapted to control the operation of said valve in predetermined timed relation to the indexing of said turret.

7. In a machine of the character described, the combination of an indexable spindle turret, means adapted to index said turret, a plurality of spindles rotatably supported by said turret and adapted to be indexed through a plurality of stations, each of said spindles comprising a movable member and a fluid pressure operated motor operatively connected to said movable member, a valve comprising relatively movable parts for connecting said fluid pressure operated motors with a source of fluid pressure, said valve being provided with ports adapted to supply fluid to all of said motors and selectively disconnect the supply of fluid to one of said motors, and means for moving one of the relatively movable parts of said valve independently of the indexing of said turret.

8. In a machine of the character described, the combination of an indexable spindle turret, means adapted to index said turret, a plurality of spindles rotatably supported by said turret and adapted to be indexed through a plurality of stations one of which is a loading station, each of said spindles comprising a movable member and a fluid pressure operated motor operatively connected to said movable member, a valve comprising relatively movable parts for connecting said fluid pressure operated motors with a source of fluid pressure, said valve having ports adapted to supply fluid to all of said motors and to selectively disconnect the supply of fluid to the fluid pressure operated motor in the loading station, and means adapted to move one of the relatively movable parts of said valve independently of the indexing of said turret.

9. In a machine of the character described, the combination of an indexable spindle turret, means adapted to index said turret, a plurality of spindles rotatably supported by said turret and adapted to be indexed through a plurality of stations, each of said spindles comprising a movable member and a fluid pressure operated motor operatively connected to said member, a valve comprising relatively movable parts for connecting said fluid pressure operated motors, said valve having ports adapted to control the flow of fluid to actuate all of said motors with a source of fluid pressure in one direction and selectively actuate one of said motors in a reverse direction, and means adapted to actuate said valve independently of the indexing of said turret.

10. In a machine of the character described, the combination of an indexable spindle turret, means adapted to index said turret, a plurality of spindles rotatably supported by said turret and adapted to be indexed through a plurality of stations one of which is a loading station, each of said spindles comprising a movable member and a fluid pressure operated motor operatively connected to said movable member, valve means comprising relatively movable parts indexable with said turret adapted to control the flow of fluid to said fluid pressure operated motors, said valve means being adapted to control the supply of fluid to actuate all of said motors in one direction during the indexing of said turret and adapted to selectively actuate the fluid pressure motor in the loading station in a reverse direction after the indexing of said turret.

11. In a machine of the character described, the combination of an indexable spindle turret, means for indexing said turret, a plurality of spindles rotatably supported by said turret and adapted to be indexed through a plurality of stations, each of said spindles comprising a movable member and a fluid pressure operated motor operatively connected to said movable member, and valve means comprising two relatively movable cooperating parts for controlling the flow of fluid to said motors, one of said parts being supported adjacent said turret and adapted to be indexed therewith, the other of said parts being supported adjacent said turret and adapted to be moved relative to the first of said parts, said first part being provided with ports communicating with one side of said fluid operated motors, said second part being provided with ports for supplying fluid to all of the ports in the first of said parts and for disconnecting the supply of fluid selectively to one of the ports in the first of said parts.

12. In a machine of the character described, the combination of an indexable spindle turret, means for indexing said turret, a plurality of spindles rotatably supported by said turret and adapted to be indexed through a plurality of stations, each of said spindles comprising a movable member and a fluid pressure operated motor operatively connected to said movable member, a valve member supported adjacent said turret and adapted to index therewith, said valve member being provided with ports communicating with one side of said fluid operated motors through which fluid is conducted to operate said motors in one direction, a second valve member supported adjacent said first valve member, means for moving said second valve member relative to said first valve member, said second valve member being provided with ports adapted to supply fluid to all of said ports in said first valve member and for disconnecting the supply of fluid selectively to one of said ports, and means for moving said second valve member independently of the rotation of said turret.

13. In a machine of the character described, the combination of a turret, means for rotating said turret, a plurality of members movably supported by said turret, a plurality of fluid pressure actuated means operatively connected to said movable members, a valve comprising relatively movable parts provided with ports adapted to normally connect a plurality of said fluid pressure actuated means with a source of fluid pressure, means for rotating a plurality of the relatively movable parts of said valve in timed relation to the rotation of said turret, and means for moving one of the parts of said valve relative to the other.

14. In a machine of the character described, the combination of a turret, a slidable member supported by said turret, a fluid pressure actuated means operatively connected to said slidable member, a valve comprising relatively movable parts provided with ports adapted to normally connect a plurality of said fluid pressure actuated means with a source of fluid pressure, means for simultaneously rotating a plurality of the relatively movable parts of said valve, and means for rotating one of said last mentioned parts relative to the other.

15. In a machine of the character described, the combination of an indexable turret, a plurality of chucks supported by said turret, a plurality of fluid pressure actuated means operatively connected to said chucks, a valve comprising relatively movable parts provided with ports adapted to normally connect a plurality of said fluid pressure actuated means, means for indexing a plurality of said parts of said valve with said turret, and means for moving one of said last mentioned parts relative to the other.

16. In a machine of the character described, the combination of an indexable turret, a chuck supported by said turret, fluid pressure actuated means operatively connected to said chuck, a valve comprising relatively movable parts provided with ports adapted to control the supply of fluid to said fluid pressure actuated means, means for simultaneously moving a plurality of said relatively movable parts, and means for moving one of said last mentioned parts relative to the other.

17. In a machine of the character described, the combination of an indexable spindle turret, means for indexing said turret, a plurality of spindles rotatably supported by said turret and adapted to be indexed through a plurality of stations, each of said spindles comprising a movable member and a fluid operated motor operatively connected to said movable member, a valve member supported adjacent said turret coaxially therewith and adapted to be indexed with said turret, said valve member being provided with ports communicating with one side of said fluid operated motors through which fluid is conducted to operate said motors in one direction, a second valve member supported coaxially with said turret and adjacent said first valve member, said second valve member being provided with ports adapted to connect all of said ports in said first valve member with the source of fluid pressure and for disconnecting the source of fluid pressure selectively from one of said ports, and means for moving said second valve member independently of the rotation of said turret.

18. In a machine of the character described, the combination of a turret, means for rotating said turret, a plurality of slidable members supported by said turret, a plurality of fluid pressure actuated means operatively connected to said slidable members, a distribution valve means supported coaxially with said turret and comprising relatively movable parts provided with ports adapted to said fluid pressure actuated means with a source of fluid pressure, means for rotating a plurality of the relatively movable parts of said valve with said turret, and means for moving one of said parts relative to the other.

19. In a machine of the character described, the combination of an indexable spindle turret, means for indexing said turret, a slidable member supported by said turret, fluid pressure actuated means operatively connected to said slidable member, a valve supported coaxial with said turret and comprising a plurality of relatively movable parts provided with ports adapted to control the supply of fluid to said fluid actuated means, means for simultaneously rotating both of said parts in predetermined time relation to the indexing of said turret, and means for rotating one of said parts relative to the other.

20. In a machine of the character described, the combination of an indexable turret, means for indexing said turret, a plurality of chucks supported by said turret, a plurality of fluid pressure actuated means operatively connected to said chucks, valve means supported coaxial with said turret and comprising relatively movable parts provided with ports adapted to control the flow of fluid to said fluid pressure actuated means, means for indexing a plurality of said parts with said turret, and means for moving one of said parts relative to the other.

21. In a machine of the character described, the combination of an indexable turret, a plurality of chucks supported by said turret, a plurality of fluid pressure actuated means operatively connected to said chucks, valve means supported coaxial with said turret and comprising two relatively movable parts provided with ports adapted to supply fluid to said fluid pressure actuated means, means for simultaneously moving both of said parts, and means for moving one of said parts relative to the other.

22. In a machine of the character described, the combination of an indexable spindle turret, means for indexing said turret, a plurality of spindles rotatably supported by said turret and adapted to be indexed through a plurality of stations, each of said spindles comprising a movable member and a fluid pressure operated motor operatively connected to said movable member, a valve means supported coaxial with said turret and comprising relatively movable parts for controlling the flow of fluid to said fluid pressure operated motors, said valve means being provided with ports for supplying fluid to all of said motors and for selectively disconnecting the supply of fluid to one of said motors, and means for producing relative movement between said parts independent of the indexing of said turret.

23. In a machine of the character described, the combination of an indexable spindle turret, means for indexing said turret, a plurality of spindles rotatably supported by said turret and adapted to be indexed through a plurality of stations one of which is a loading station, each of said spindles comprising a movable member and a fluid pressure operated motor operatively connected to said movable member, valve means for said fluid pressure operated motors supported coaxial with said turret and comprising relatively movable parts, said valve means having ports adapted to connect the supply of fluid to all of said motors and to selectively disconnect the supply of fluid to the fluid pressure operated motor in the loading station, and means for producing relative movement between said valve parts independent of the indexing of said turret.

24. In a machine of the character described, the combination of an indexable spindle turret, means for indexing said turret, a plurality of spindles rotatably supported by said turret and adapted to be indexed through a plurality of stations one of which is a loading station, each of said spindles comprising a movable member and a fluid pressure operated motor operatively connected to said movable member, valve means supported coaxial with said turret and comprising relatively movable parts adapted to control the flow of fluid to said fluid pressure operated motors, said valve means having ports adapted to control the supply of fluid to actuate all of said motors in one direction during the indexing of said turret and for selectively actuating the fluid pressure motor in the loading station in a reverse direction after the indexing of said turret.

25. In a machine of the character described, the combination of a frame, a plurality of spindles rotatably supported by said frame, means for driving said spindles, means supported by said spindles for connecting and disconnecting said means to and from said spindles, a plurality of chucks supported by said spindles, means supported by said spindles for operating said chucks, a plurality of fluid pressure operated means supported by said spindles and operatively connected to one of said last mentioned means, and valve means for controlling the flow of fluid to a plurality of said fluid pressure operated means, said valve means having ports therein adapted to control the flow of fluid to positively actuate said fluid pressure operated means in different directions.

26. In a machine of the character described, the combination of a plurality of rotatable spindles, a chuck carried by each of said spindles, a fluid pressure motor carried by each of said spindles, means operatively connecting said fluid pressure motors and said chucks, a valve comprising relatively movable parts for controlling the flow of fluid to a plurality of said motors, said valve being provided with ports adapted to control the flow of fluid to positively actuate said motors in opposite directions, means for simultaneously moving a plurality of the relatively movable parts of said valve as a unit, and means for producing relative movement between said last mentioned parts of said valve.

27. In a machine of the character described, the combination of a plurality of rotatable spindles, means for driving said spindles, a clutch carried by each of said spindles adapted to connect and disconnect the same with said means, a chuck supported by each of said spindles, automatic means for operating said clutch at predetermined intervals, a fluid pressure motor operatively connected to each of said chucks, and valve means for controlling the flow of fluid to a plurality of said motors, said valve means comprising a member having a passage in constant communication with a source of fluid pressure adapted to be serially connected to said motors and a pair of passages adapted to be serially connected to said motors and means for connecting one passage of said pair with a source of fluid pressure and the other passage of said pair with exhaust.

28. In a machine of the character described, the combination of a frame, a plurality of spindles rotatably supported by said frame, means for driving said spindles, a brake adapted to be applied to each of said spindles, means for engaging and disengaging said driving means from said spindles and releasing and applying said brake, a chuck carried by each of said spindles, a fluid pressure operated motor carried by each of said spindles, means for operatively connecting said fluid pressure operated motors and said chucks, and valve means for controlling the flow of fluid to a plurality of said fluid pressure operated motors, said valve means having ports therein adapted to control the flow of fluid to positively operate said motors in opposite directions.

29. In a machine of the character described, the combination of an indexable turret comprising a plurality of fluid actuated motors, means for indexing said turret, means comprising two relatively movable members for operatively connecting said motors with a source of fluid under pressure, one of said members having a plurality of ports communicating with said motors, the other of said members having a port adapted to connect one of said first mentioned ports with the fluid supply, means for maintaining said members in predetermined relative position during indexing of said turret, and means for producing relative movement between said members for successively connecting said first mentioned ports with the fluid supply.

30. In a machine of the character described, the combination of an indexable turret comprising a plurality of fluid actuated motors, means for indexing said turret, means comprising two relatively rotatable members supported coaxial with said turret for operatively connecting said motors with a source of fluid under pressure, one of said members having a plurality of ports communicating with said motors, the other of said members having a port adapted to connect one of said first mentioned ports with a source of fluid supply, means for maintaining said members in predetermined relative position during the indexing of said turret, and means for producing relative movement between said members for successively disconnecting and connecting said first mentioned ports with the source of fluid supply.

31. In a machine of the character described, the combination of an indexable turret comprising a plurality of fluid actuated motors, means for indexing said turret, means comprising two relatively movable members for operatively connecting said motors with a source of fluid under pressure, one of said members having a plurality of ports communicating with said motors, the other of said members having a port for connecting a plurality of said first mentioned ports to the fluid supply, means for maintaining said members in predetermined relative position during indexing of said turret, and means for producing relative movement between said members for successively disconnecting the first mentioned ports from the fluid supply.

32. In a machine of the character described, the combination of an indexable turret comprising a plurality of fluid actuated motors, means for indexing said turret, means comprising two relatively movable members for connecting said motors with a source of fluid under pressure, one of said members having a plurality of pairs of ports communicating with said motors, the other of said members having a pair of ports for connecting a pair of said first mentioned ports with a source of fluid supply and discharge, means for maintaining said members in predetermined relative position during indexing of said turret, and means for producing relative movement between said members whereby said first mentioned pairs of ports are successively connected and disconnected with said pair of ports in the other of said members.

33. In a machine of the character described, the combination of an indexable turret comprising a plurality of fluid actuated motors, means for indexing said turret, two relatively movable members, one of said members having a plurality of pairs of ports communicating with said motors, the other of said members having a pair of ports for connecting a pair of said first mentioned ports with a source of fluid supply and discharge and a second pair of ports for connecting a pair of said first mentioned ports with a source of fluid supply and discharge, and means for successively connecting and disconnecting said first mentioned pairs of ports with and from the second and third mentioned pairs of ports.

34. In a machine of the character described, the combination of an indexable turret comprising a plurality of fluid actuated motors, means for indexing said turret, two relatively movable members, one of said members having a plurality of pairs of ports communicating with said motors, the other of said members having a pair of ports for connecting a pair of said first mentioned ports with a source of fluid supply and discharge and a second pair of ports for connecting a pair of said first mentioned ports with a source of fluid supply and discharge, means for maintaining said members in predetermined relative position during indexing of said turret, and means for producing relative movement between said members for successively connecting and disconnecting said first mentioned pairs of ports with and from the second and third mentioned pairs of ports.

35. In a machine of the character described, the combination of an indexable turret comprising a plurality of fluid actuated motors, means for indexing said turret, two relatively rotatable members supported coaxial with said turret, one of said members having a plurality of pairs of ports communicating with said motors, the other of said members having a pair of ports for connecting a plurality of pairs of said first mentioned ports with a source of fluid supply and discharge, and a second pair of ports for connecting another pair of said first mentioned ports with a source of fluid supply and discharge, and means for successively connecting said first mentioned pairs of ports with said third mentioned pair of ports.

36. A machine tool comprising a frame, a turret rotatably supported by said frame, a plurality of spindles rotatably supported by said turret, means for rotating said turret, a plurality of fluid pressure actuated devices carried by said spindles, a stationary source of fluid pressure, and means for connecting said fluid pressure actuated devices with said source of fluid pressure and with exhaust, said last mentioned means comprising a distributor provided with a plurality of pairs of passages adapted to be serially connected to each of said fluid pressure actuated devices.

37. A machine tool comprising a frame, a turret rotatably supported by said frame, a plurality of spindles rotatably supported by said turret, means for intermittently rotating said turret, a plurality of fluid pressure actuated devices carried by said spindles, a stationary source of fluid pressure, and means for connecting said fluid pressure actuated devices with said source of fluid pressure and with exhaust, said last mentioned means comprising a distributor provided with a plurality of circumferentially spaced pairs of passages adapted to be serially connected to each of said fluid pressure actuated devices, and means for connecting one passage of each of said pairs of passages with a source of fluid pressure and the other passage of each of said pairs of passages with exhaust.

38. A machine tool comprising a frame, a turret rotatably supported by said frame, means for rotating said turret, a plurality of fluid pressure actuated devices carried by said turret, a stationary source of fluid pressure, and means for connecting said fluid pressure actuated devices with said source of fluid pressure and with exhaust, said last mentioned means comprising a distributor provided with a plurality of semi-annular passages adapted to be serially connected to each of said fluid pressure actuated devices and in constant communication with a plurality thereof, and a plurality of passages adapted to be serially connected to each of said fluid pressure actuated devices when they are disconnected from said semi-annular passages.

39. A machine tool comprising a frame, a turret rotatably supported by said frame, a plurality of spindles rotatably supported by said turret, means for intermittently rotating said turret, a plurality of fluid pressure motors carried by said spindles, a stationary source of fluid pressure, and means for connecting said fluid pressure actuated motors with said source of fluid pressure and with exhaust, said last mentioned means comprising a distributor provided with a plurality of semi-annular passages adapted to be serially connected to each of said fluid pressure actuated motors and in constant communication with a plurality thereof and a plurality of passages circumferentially spaced from said semi-annular passages adapted to be serially connected to each of said fluid pressure actuated motors as they are disconnected from said semi-annular passages, and means for constantly connecting one of said semi-annular passages with said source of fluid pressure and the other thereof with exhaust.

40. In a metal working machine, a plurality of fluid pressure chucking devices, a pressure fluid distributor including a member having a pair of annular passages in constant communication with a plurality of said chucking devices, means for connecting said passages to a source of fluid pressure and with exhaust, said distributor having a second pair of passages to be serially connected with each of said chucking devices after the latter have been disconnected from said first mentioned pair of annular passages, and means for connecting said second pair of passages to a source of fluid pressure and with exhaust.

41. In a metal working machine, a plurality of fluid pressure chucking devices, fluid pressure distributing means for said chucking devices, said distributing means including a pair of relatively movable members in contact with each other having a pair of passages therebetween in normal communication with a plurality of said chucking devices to hold the latter closed, said distributing means having a second pair of passages to be serially connected to each chucking device after each chucking device has been removed from communication with said first mentioned pair of passages, and means for connecting said second mentioned pair of passages with the source of fluid pressure and with exhaust.

HARRY W. RUPPLE.